United States Patent
Migli et al.

(10) Patent No.: US 10,495,125 B2
(45) Date of Patent: Dec. 3, 2019

(54) JOINT FORMING DEVICES

(71) Applicant: Lama D. D. Dekani, Dekani (SI)

(72) Inventors: Carlo Migli, Lecco (IT); William Ernest Taylor Vallance, Buckinghamshire (GB); Valter Svara, Izola (SI); Robert Lukezic, Portoroz (SI); Simon Krizman, Kozina (SI)

(73) Assignee: Titus d.o.o. Dekani, Dekani (SI)

( * ) Notice: Subject to any disclaimer, the term of this patent is extended or adjusted under 35 U.S.C. 154(b) by 179 days.

(21) Appl. No.: 15/534,512

(22) PCT Filed: Dec. 11, 2015

(86) PCT No.: PCT/EP2015/079501
§ 371 (c)(1),
(2) Date: Jun. 9, 2017

(87) PCT Pub. No.: WO2016/092105
PCT Pub. Date: Jun. 16, 2016

(65) Prior Publication Data
US 2017/0363125 A1    Dec. 21, 2017

(30) Foreign Application Priority Data
Dec. 12, 2014 (GB) .................................. 1422164.2

(51) Int. Cl.
*F16B 12/20* (2006.01)
*F16B 12/46* (2006.01)
*A47B 96/06* (2006.01)

(52) U.S. Cl.
CPC .......... *F16B 12/2036* (2013.01); *F16B 12/46* (2013.01); *A47B 96/066* (2013.01); *F16B 2012/2018* (2013.01)

(58) Field of Classification Search
CPC .............. F16B 12/2036; F16B 12/2009; F16B 2012/2045; F16B 2012/2072; A47B 2230/0033
See application file for complete search history.

(56) References Cited

U.S. PATENT DOCUMENTS 3,730,568 A * 5/1973 Giovannetti ........ F16B 12/2036
403/245
4,047,822 A * 9/1977 Lehmann ............ F16B 12/2036
403/187

(Continued)

FOREIGN PATENT DOCUMENTS

CN            202381478 U    8/2012
DE        202004013378 U1   12/2004

(Continued)

*Primary Examiner* — Daniel J Wiley
(74) *Attorney, Agent, or Firm* — Alan D. Kamrath; Karin L. Williams; Mayer & Williams PC

(57) ABSTRACT

A fastening element (20) is provided for use with a tightening element (14) in a device for forming a joint between two panels (18,22). The fastening element is elongate and has a head (13) at one end for engaging the tightening element, an expander (15) at the other end and a shank (11) extending there between. The fastening element further comprises a sleeve (10) having an expandable section (16) at one end extending over the expander, with the expander operatively engaging the sleeve to cause outward movement of its expandable section upon axial displacement of the fastening element relative to the sleeve. The sleeve is provided with at least one outwardly facing cutting edge (19) on its expandable section. The cutting edge has sufficient strength to cut into the panel material in use of the device, when the expandable section is inserted into a face hole in a first one of the panels.

14 Claims, 3 Drawing Sheets

(56) References Cited

U.S. PATENT DOCUMENTS

| | | | | |
|---|---|---|---|---|
| 4,127,353 A | * | 11/1978 | Busse | F16B 12/2054 |
| | | | | 312/264 |
| 4,131,376 A | * | 12/1978 | Busse | F16B 12/2036 |
| | | | | 312/263 |
| 4,518,278 A | * | 5/1985 | Koch | F16B 12/2036 |
| | | | | 403/230 |
| 5,375,923 A | * | 12/1994 | Hall | A47B 88/956 |
| | | | | 312/330.1 |
| 5,567,081 A | * | 10/1996 | Vallance | F16B 12/2036 |
| | | | | 403/231 |
| 5,810,505 A | * | 9/1998 | Henriott | F16B 12/14 |
| | | | | 108/153.1 |
| 6,276,867 B1 | * | 8/2001 | Vallance | F16B 12/2036 |
| | | | | 403/231 |
| 6,276,868 B1 | * | 8/2001 | Vallance | F16B 12/2009 |
| | | | | 403/231 |
| 6,866,455 B2 | * | 3/2005 | Hasler | F16B 5/0024 |
| | | | | 403/297 |
| 7,223,045 B2 | * | 5/2007 | Migli | F16B 12/2009 |
| | | | | 29/452 |
| 7,494,297 B2 | * | 2/2009 | Brede | F16B 12/2009 |
| | | | | 403/231 |
| 8,714,863 B2 | * | 5/2014 | Vallance | F16B 12/2036 |
| | | | | 403/245 |
| 2003/0118397 A1 | | 6/2003 | Hasler | |
| 2005/0042027 A1 | | 2/2005 | Migli | |

FOREIGN PATENT DOCUMENTS

| | | |
|---|---|---|
| DE | 102009043179 A1 | 9/2011 |
| WO | WO2014060608 A2 | 4/2014 |

\* cited by examiner

JOINT FORMING DEVICES

This invention relates to fastening elements for joint forming devices such as may be used in the furniture industry.

The invention provides a fastening element for use with a tightening element in a device for forming a joint between two panels, the fastening element being elongate and having a head at one end for engaging said tightening element in use, an expander at the other end, and a shank extending therebetween, the fastening element further comprising a sleeve having an expandable section at one end extending over said expander, with the expander operatively engaging the sleeve in use to cause outward movement of its expandable section upon axial displacement of the fastening element relative to the sleeve, the sleeve having at least one outwardly facing cutting edge on its expandable section, with the expandable section of the sleeve being insertable into a face hole in a first one of the panels, with said cutting edge having sufficient strength to cut into the panel material in use of the device.

Figure 2:
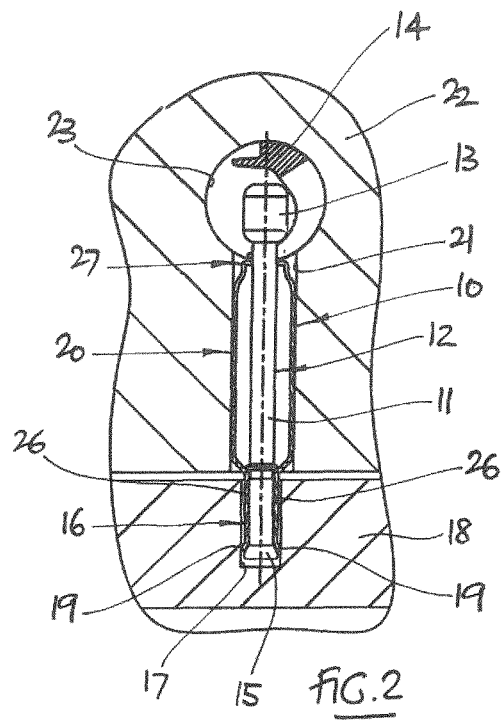
Figure 3:
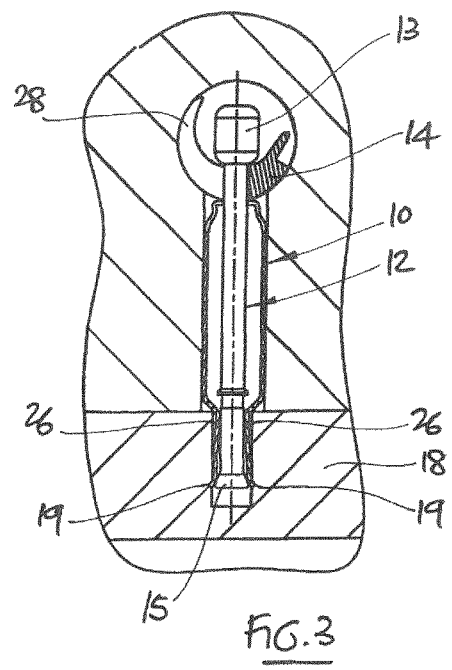
Figure 4:
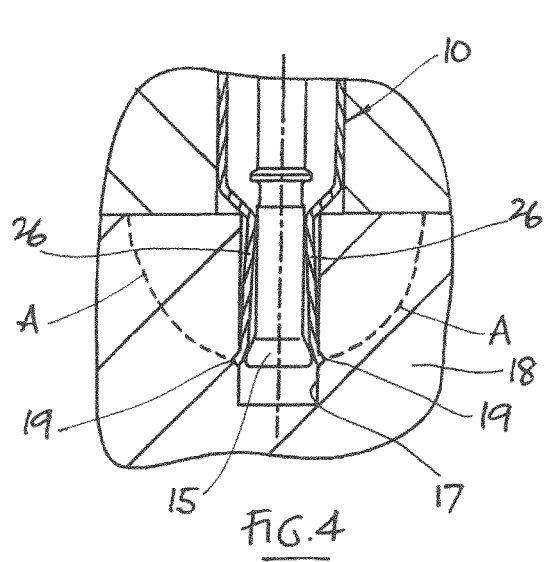
Figure 1:
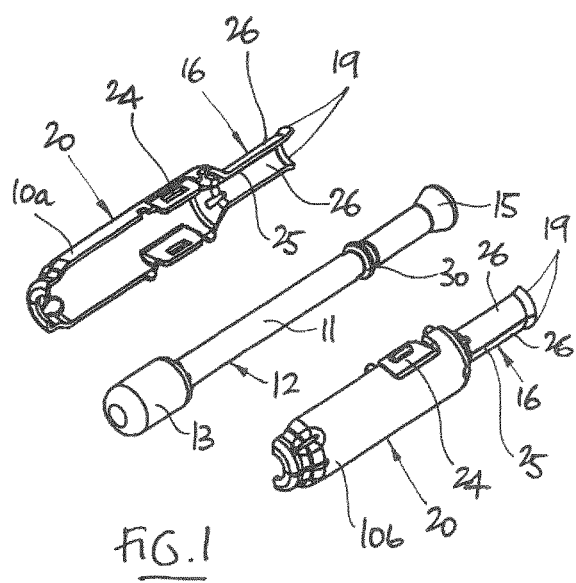
Figure 6:
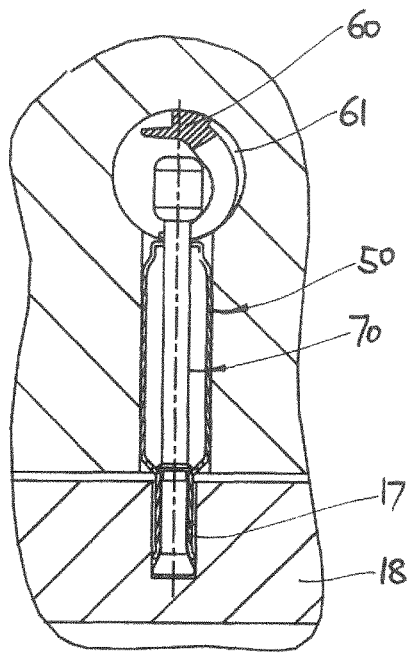
Figure 7:
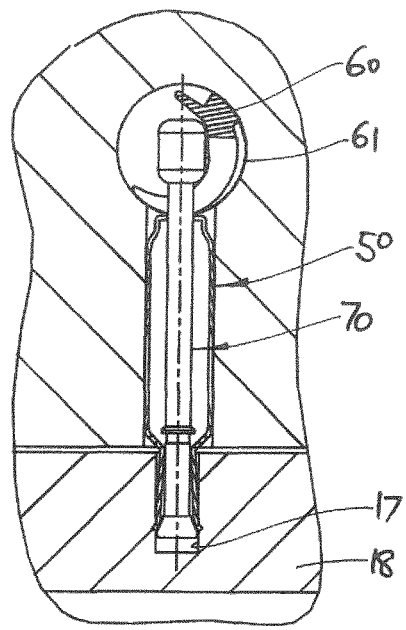
Figure 8:
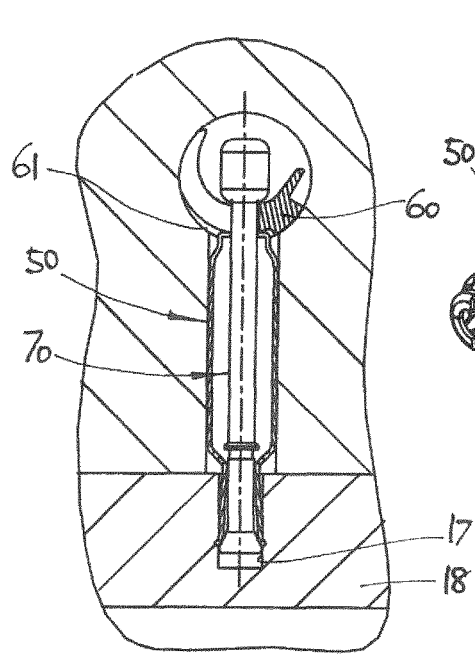
Figure 5:
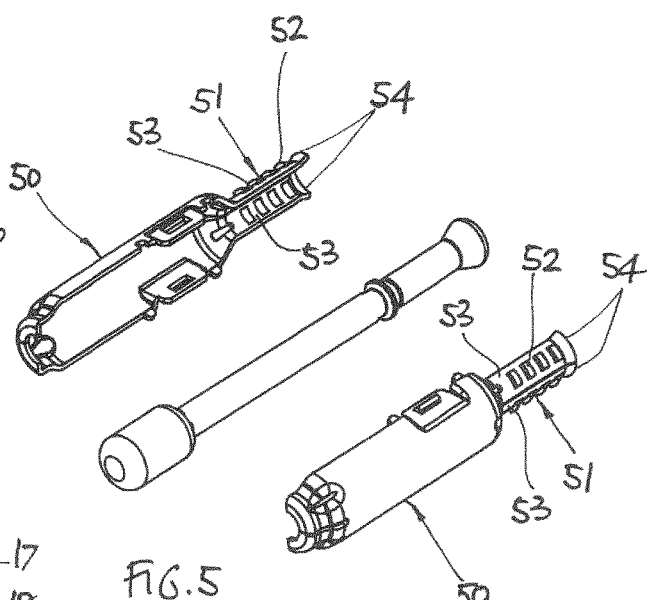
Figure 9:
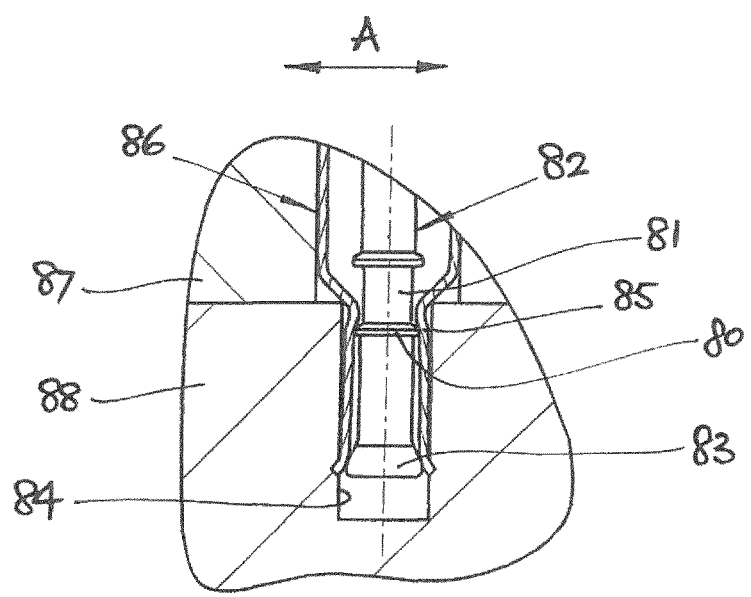

By way of example, embodiments of the invention will now be described with reference to the accompanying drawings, in which:

FIG. 1 shows in exploded view a first form of fastening element according to the invention, FIG. 2 is a cross-sectional view through a panel joint showing a device with the fastening element of FIG. 1 in its un-set condition, FIG. 3 shows the panel joint of FIG. 2 in its set condition, FIG. 4 is an enlarged detail of FIG. 3, FIG. 5 shows in exploded view a second form of fastening element according to the invention, FIG. 6 is a cross-sectional view through a panel joint showing a device with the fastening element of FIG. 5 in its un-set condition, FIG. 7 shows the panel joint of FIG. 5 in a partially set condition, FIG. 8 shows the panel joint of FIG. 5 in its fully set condition, and FIG. 9 shows a modified form of dowel for the fastening elements of FIGS. 1 and 5.

Devices are known for joining together panels, such as are used for assembly of furniture panels in factories or at home in furniture known as "flat pack" or "ready to assemble" or "knock down" furniture, and which typically comprise a tightening element in the form of a rotatable cam and a fastening element in the form of an elongate sleeved dowel. In such devices, the fastening element is anchorable at one end in a face hole in one panel, with the cam being mounted in a hole in the other panel and being operatively engageable with the head of the dowel at its other end. Conventionally, the dowels are formed of a metal pin, with an expandable sleeve, typically of plastics material, which can be set in the face hole by axial displacement of the dowel relative to the sleeve upon rotation of the cam.

FIG. 1 illustrates a form of fastening element in which its sleeve is made of metal. In the preferred form, the sleeve 10 is made out of sheet metal, for example steel, by die cutting and stamping or pressing. To facilitate assembly, the sleeve 10 here is conveniently made in two individual parts 10a, 10b that can be fitted around the dowel 12. In this case, the two parts 10a, 10b are each in the form of a semi-cylindrical shell. Connectors, in this case snap tabs 24, enable the two parts 10a, 10b to attach together when they are in position on the dowel 12, so that the sleeve 10 and dowel together form an integral sub-assembly.

The sleeve could of course be formed in other configurations, such as by means of a one-piece construction that is wrapped around the dowel, or using more than two individual parts. It could also be formed using a different metal, such as zinc, or a non-metal, such as carbon, or a hybrid composition from two or more different materials. Also, other processes such as die casting could be used in the formation of the sleeve.

The dowel 12 here is of generally known form, with a head 13 at one end to be engaged by a rotatable camming device 14, an expander 15 at the other end, and a shank 11 extending between the two. Here, the dowel 12 is conveniently made from rolled steel. The expander 15 is of generally known form, with a flared, bell-shaped end. The conical shape of the expander 15 effectively forms a reaction surface for the outward expansion of the sleeve 10.

The dowel 12 here additionally has a flange 30 on its shank 11. The flange 30 is designed to engage the sleeve 10, in this case at the junction of its expandable section 16. Its purpose is to ensure that the sleeve 10 will be pushed fully into the face hole 17 when the sub-assembly is initially engaged in the panel 18.

The dowel 12 could of course be formed out of different materials and in other ways, for example by die casting from zinc or fabricating from a non-metal such as carbon, or by combinations of different materials and forming processes.

The sleeve 10 has two main sections. At one end is its expandable section 16: this is the part that fits into the face hole 17 in the first panel 18. The expandable section 16 here is formed with a number of axially extending slits 25, so that it is effectively split up into a number of individual fingers 26. The fingers 26 are designed to facilitate the expansion process. In this case, the sleeve 10 has four fingers 26, but the number could of course be more or less.

The slits 25 extend substantially over the whole of the expandable section 16, terminating approximately at or just beyond its junction with the other main section 20 of the sleeve. This means that the length of the fingers 26 is approximately equal to the depth of the face hole 17 in the panel 18. What this means in practice is that in the expansion process, the fingers 26 will tend to flex with a hinging motion, as will be described in more detail below.

At their free ends, each of the fingers 26 presents an outwardly facing cutting edge 19. The cutting edges 19 extend around the dowel 12 in an arcuate profile. They are designed to cut into the material of the panel 18 in the expansion process. They will not normally have to be specially sharpened for this purpose: the edge that results from simply cropping the fingers 26 in a die cutting process will usually be sufficient.

The fingers 26 are crimped so that their free ends have a slight outward flare. This assists with presenting the cutting edges 19 so that they will cut effectively into the material in the expansion process. It also facilitates the sliding engagement of the fingers 26 on the expander 15 in the expansion process. The fingers 26 here otherwise give the expandable section 16 an essentially plain cylindrical outer profile.

The expandable section 16 is designed to be readily insertable into the face hole 17 by hand, but to form a relatively snug fit within it.

The other section 20 of the sleeve 10 is designed to fit in an edge hole 21 in the second panel 22. This section 20 also has an essentially plain cylindrical outer profile and is designed to be readily insertable into its hole 21 by hand, but to form a relatively snug fit within it.

The edge hole 21 communicates with a face hole 23 in the second panel 22, with the face hole providing a mount for a rotatable camming device 14 to engage the head 13 of the dowel 12 in use. The free end of this section 20 of the sleeve 10 terminates in a reduced diameter section 27. In use, this section 27 abuts against the outer cylindrical surface of the camming element 14.

In known manner, when the camming device 14 is rotated about its axis, its jaws 28 engage with the head 13 of the dowel 12 to cause axial displacement of the dowel in a direction away from the first panel 18. Since the sleeve 10 is in abutting engagement with the outer surface of the camming device 14, it is prevented from moving. The net result is relative axial movement between the dowel 12 and the sleeve 10.

FIGS. 3 and 4 show the consequence of this relative movement between the dowel 12 and the sleeve 10. As will be seen, the axial displacement of the expander 15 has forced the fingers 26 of the sleeve 10 to flex outwardly at their free ends, by the action of the expander 15 on the flared end of the fingers. In so doing, the cutting edges 19 of the fingers 26 have been forced outwardly and hence caused to cut into the material of the panel 18. It can be seen in FIG. 4 how the flexing of the fingers 26 resembles a hinging motion from a position approximately level with the face of the panel 18.

It is intended that the cutting edges 19 will penetrate into the material to a sufficient depth to prevent the possibility of the sleeve 10 being simply pulled out of the face hole 17. This provides a solid point of anchorage for the sleeve 10. Ideally, the anchorage point is at a position as near to the bottom of the face hole 17 as possible.

Panels used in flat pack furniture are typically made out of composite materials such as wood chip or the like. These typically contain voids between particulate matter and have little inherent strength. The aim in this particular design of dowel is to ensure that its point of engagement with the face hole in the panel will be at depth. It is also to ensure that the dowel engages the material with a positive interference fit. In this way, the effective pull-out resistance of the device is maximised. It may be preferable for the sleeve to present cutting edges at different axial positions, so as to cut into the material at different depths.

Pull-out resistance is a measure of the pulling force that is needed to pull a dowel out of a panel and hence is an indication of the strength of a joint. Conventional expandable sleeve dowel designs feature ribs or barbs along the length of their sleeves, effectively creating a series of local interference fits with the material along the bore of the face hole. The pull-out resistance of these conventional designs is limited, however, because the friable nature of the material does not provide strong resistance to the possibility of the ribs or barbs simply pulling through.

In the fastener described above, since the cutting edges 19 of the fingers 26 are designed to cut relatively deeply into the material and at a position at or near to the bottom of the face hole 17, there will be a significant depth of material between the point of anchorage of the fastener and the face of the panel 18. What this means in practice is that the fastener cannot be pulled out of the face hole 17 without causing significant disintegration of the panel 18. In particular, pull-out of the fastener will require a sizeable chunk of material to break away from the panel 18. In effect, therefore, the cutting edges act in the manner of a crack propagator, so that a typical failure mode will be along fracture lines A A shown in FIG. 4. The net effect is that the pull-out resistance of the fastener is considerably greater than for a conventional fastener.

It will be appreciated that for the fastener described above to work effectively, the cutting edge that cuts into the panel has to be stronger than the panel material and to be able to maintain its configuration under stress. This will not normally be possible with conventional fasteners, where the sort of plastic sleeves that are typically used do not have sufficient strength or rigidity. Using a metal such as steel to fabricate the sleeve ensures that there will be sufficient strength and rigidity. However, it will be understood that other materials could equally well be used, even plastics, providing it is is of a grade with sufficient strength and rigidity.

The form of fastener seen in FIG. 5 is essentially similar to that shown in FIG. 1. In this case, however, the expandable section 51 of the sleeve 50 is not plain, but is provided with additional barbs 52. The sleeve 50 still comprises flexible fingers 53 with cutting edges 54 at their free ends that operate in the expansion process in the same manner as described above. The barbs 52 do not interfere with this operation. Instead, their purpose is to engage the bore of the face hole 17 in the panel 18 substantially throughout its depth and hence provide additional stability to the anchorage of the fastener in the panel.

As will be seen in FIGS. 6, 7 and 8, another difference from the jointing device described above is in the design of the camming device 60. In this case, the camming device 60 is provided with a tapering groove 61 in its outer circumferential surface. The purpose of the groove 61 is to allow for a certain degree of axial displacement of the sleeve 50 during the joint forming process. In known manner, initial rotation of the camming device 60 causes the expansion process to anchor the sleeve 50 in the face hole 17 in its panel 18, as seen in FIG. 7. Further rotation of the camming device 60 then pulls both the dowel 70 and the sleeve 50, thus pulling the panel 18 with it and hence creating a tight joint.

Flat pack furniture is typically expected to be capable of being disassembled and re-assembled, so it is preferable to be able to extract the cams and/or dowels of the fasteners described above from their panels. For the dowels to be capable of being pulled out of their face holes, the fingers of their sleeves would have to retract sufficiently for the cutting edges to clear the bore of the face hole. In practice, depending on materials used, this is unlikely to occur without special provision. Accordingly, to facilitate extraction, the fingers are preferably cut at a slight angle, rather than square, and at slightly spaced apart axial positions, in order that their cutting edges are effectively aligned along a helical path. This then allows the possibility for the dowel and sleeve to be "unscrewed" out of the face hole, with the cutting edges effectively cutting a helical groove in the bore of the face hole in the process, somewhat in the manner of a screw thread.

Alternatively, or in addition, it might be possible to include a mechanism for urging retraction of the fingers of the sleeve to facilitate removal of the dowel from the face hole on disassembly, for example by suitably configuring the sleeve at its point of engagement with the flange on the shank of the dowel.

A preferred modification to the dowels described above is seen in FIG. 9. The modification comprises a flange 80 on the shank 81 of the dowel 82. As will be seen, the flange 80 is located on the lower section of the dowel 81. Specifically, the flange 80 is spaced from the expander region 83 of the dowel 82 by a distance less than the depth of the face hole 84 in which the fastening element is located. The flange 80 is designed to engage the fingers 85 of the sleeve 86 near the entrance to the face hole 84 when the fastening element is in its set position (as seen in FIG. 9). The purpose of the arrangement is to ensure that the fingers 85 of the sleeve 86 will fit snugly in the bore of the face hole 84. This eliminates or at least substantially reduces the possibility for lateral "play", ie transverse shearing movement between the two panels 87, 88 (illustrated by arrow A in FIG. 9).

The invention claimed is:

1. A fastening element for use with a tightening element in a device for forming a joint between two panels, the fastening element comprising:
    an elongate dowel having a head at a first end and engaging the tightening element in use, an expander at a second end opposite the first end, and a shank extending between the head and the expander;
    a sleeve with an expandable section at a first end extending over said expander, the expander operatively engaging the sleeve in use to cause outward movement of the expandable section upon axial displacement of the dowel relative to the sleeve,
        with the sleeve having at least one outwardly facing projection on the expandable section, with the expandable section of the sleeve being insertable into a face hole in a first one of two panels,
        with the at least one outwardly facing projection on the sleeve being in the form of a cutting edge that extends around the dowel in an arcuate profile and having sufficient strength to cut into the panel, with the cutting edge located at or near the end of the expandable section of the sleeve,
        with the expandable section of the sleeve having two or more individually moveable finger portions each with a cutting edge, the finger portions being hingedly moveable from a position approximately level with a face of the first one of the two panels, and
        with the dowel including a flange engaging the sleeve at a position spaced from the expander, within a bore of the face hole near an entrance to the face hole, when the fastening element is in a set position.

2. A fastening element as claimed in claim 1 wherein the end of the expandable section of the sleeve has an outward flare.

3. A fastening element as claimed in claim 2 wherein the cutting edges of the fingers are at different axial positions on the sleeve.

4. A fastening element as claimed in claim 1 wherein the cutting edges of the fingers are at different axial positions on the sleeve.

5. A fastening element as claimed in claim 4 wherein the cutting edges are set at an inclined angle, so that they are effectively aligned along one or more helical paths.

6. A fastening element as claimed in claim 1 wherein apart from the cutting edge, the expandable section of the sleeve has an essentially plain outer profile.

7. A fastening element as claimed in claim 6 wherein the essentially plain outer profile of the expandable section of the sleeve is cylindrical.

8. A fastening element as claimed in claim 1 wherein the sleeve is insertable at its other end into an edge hole in the second of the panels for engagement of the head of the dowel with the tightening element.

9. A fastening element as claimed in claim 8 further comprising a reaction surface for holding the axial position of the sleeve relative to the second panel upon tightening of the device.

10. A fastening element as claimed in claim 9 wherein said reaction surface comprises an outer camming surface of the tightening device, with the sleeve being in abutting engagement with the outer camming surface.

11. A fastening element as claimed in claim 1 wherein the sleeve is formed in two or more individual parts.

12. A fastening element as claimed in claim 11 wherein the two or more individual parts of the sleeve comprise means for connecting the two or more individual parts together so that the fastening element is able to form an integral sub-assembly.

13. A fastening element as claimed in claim 1 wherein the sleeve is made of metal.

14. A fastening element as claimed in claim 13 wherein the sleeve is made by die-cutting and stamping or pressing.

* * * * *